US008543382B2

United States Patent
Khorsheed et al.

(10) Patent No.: US 8,543,382 B2
(45) Date of Patent: Sep. 24, 2013

(54) METHOD AND SYSTEM FOR DIACRITIZING ARABIC LANGUAGE TEXT

(75) Inventors: Mohammad Sulaiman Khorsheed, Riyadh (SA); Hussein Khalid Al-Omari, Amman (JO)

(73) Assignee: King Abdulaziz City for Science and Technology (KACST), Riyadh (SA)

( * ) Notice: Subject to any disclaimer, the term of this patent is extended or adjusted under 35 U.S.C. 154(b) by 269 days.

(21) Appl. No.: 12/913,667

(22) Filed: Oct. 27, 2010

(65) Prior Publication Data

US 2012/0109633 A1    May 3, 2012

(51) Int. Cl.
*G06F 17/27* (2006.01)
*G06F 17/20* (2006.01)

(52) U.S. Cl.
USPC .................................. 704/9; 704/8

(58) Field of Classification Search
None
See application file for complete search history.

(56) References Cited

U.S. PATENT DOCUMENTS

| 7,966,173 | B2 * | 6/2011 | Emam et al. | 704/9 |
| 8,041,559 | B2 * | 10/2011 | El-Shishiny | 704/9 |
| 8,069,045 | B2 * | 11/2011 | Emam et al. | 704/256 |
| 2008/0300861 | A1 * | 12/2008 | Emam et al. | 704/8 |
| 2011/0137635 | A1 * | 6/2011 | Chalabi et al. | 704/2 |

OTHER PUBLICATIONS

Gal, "An HMM Approach to Vowel Restoration in Arabic and Hebrew", Semitic '02 Proceedings of the ACL-02 workshop on Computational approaches to semitic languages, pp. 1-7, 2002.*
Mohamed et al., "Diacritization for real-world Arabic texts", In Proceedings of Recent Advances in Natural Language Processing, 2009.*
Elshafei et al., "Statistical Methods for Automatic diacritization of Arabic text", In Proceedings of 18th national computer conference NCC'18, Mar. 26-29, 2006.*

* cited by examiner

*Primary Examiner* — Brian Albertalli
(74) *Attorney, Agent, or Firm* — Timberline Patent Law Group PLLC (57) ABSTRACT

The present invention provides a method and system for diacritizing a text. The method includes analyzing the text to determine whether the text require one or more diacritical marks of a set of diacritical marks. The text includes a plurality of characters associated with an Arabic language. Thereafter, the text is processed for identifying diacritical marks for each character of the plurality of characters. Subsequently, the diacritical marks of the set of diacritical marks are applied on each character of the plurality of characters based on a context associated with the text to obtain a diacritized Arabic text.

12 Claims, 5 Drawing Sheets

| Diacritical Mark | State Code |
|---|---|
| Fat-hah | S1 |
| Shaddah + Fat-hah | S2 |
| Tanween Fat-hah | S3 |
| Shaddah + Tanween Fat-hah | S4 |
| Dhammah | S5 |
| Shaddah + Dhammah | S6 |
| Tanween Dhammah | S7 |
| Shaddah + Tanween Dhammah | S8 |
| Kasrah | S9 |
| Shaddah + Kasrah | S10 |
| Tanween Kasrah | S11 |
| Shaddah + Tanween Kasrah | S12 |
| Maddah | S13 |
| Sukun | S14 |
| No diacritic | S15 |

METHOD AND SYSTEM FOR DIACRITIZING ARABIC LANGUAGE TEXT

FIELD OF THE INVENTION

The present invention generally relates to diacritizing a non-diacritized text and more specifically, to a method and system for diacritizing a non-diacritized Arabic text.

BACKGROUND OF THE INVENTION

Alphabets in the Arabic language consist of twenty-eight letters. Of the twenty-eight letters, twenty-five letters represent consonants. The remaining three letters in the Arabic language represent long vowels of Arabic. In addition, the Arabic language consists of six vowels that are divided into three pairs consisting of a short vowel and a long vowel. As such, each pair corresponds to a different phonetic value. A distinguished feature of the Arabic writing system is that short vowels are not represented by the alphabets. Instead, the alphabets are marked by so-called diacritics i.e. short strokes which are placed either above or below the preceding consonant. This process of adding the diacritics to non-diacritized text is called diacritization.

Modern written text in Arabic language is almost never diacritized i.e. the modern written Arabic texts are composed of the Arabic alphabets that leaves out the vowels of the words. However, diacritics perform an essential function in pronouncing a certain word. In general, in Arabic texts, there are multitudes of possible vowel combinations for the same set of alphabets that constitute a word. On one hand, each word formed using multitudes of possible vowel combination is correct in the sense that the form is valid. However, on the other hand the context in which these words are used, not all words formed this way are correct. To illustrate this with an example: consider the following word "كلية" which can be pronounced as either "كُلِّيَة"—college, or "كِلْيَة"—kidney. Thus, for an undiacritized Arabic word there may be a vast number of pronunciations whereas for diacritized Arabic words it is only one pronunciation. In spite of this importance, Arabic texts may be undiacritized and readers of Arabic texts are accustomed to inferring the meaning from the context of the Arabic texts and knowledge of the grammar and lexicon of the Arabic language.

Therefore, lexical ambiguity exists at the word level in the Arabic text. Recent studies revealed that about 74% of the words in the Arabic text are lexically ambiguous. Contributing to lexical ambiguity in the Arabic text is the fact that Arabic morphology is complex. On an average, there are five possible different morphological analyses per Arabic word. In addition, prefixes and suffixes can be attached to words in Arabic texts in a concatenative manner. Therefore, word lexical disambiguation and vowel restoration in Arabic texts is a challenging task.

As such, with word lexical ambiguity it is impossible to determine how to pronounce a non-diacritized Arabic text. Moreover, multiple pronunciations are possible for many words in the Arabic language. Hence, automatically restoring the diacritized form of Arabic texts would be helpful for non-native speakers. In addition, a task of diacritizing beginners' texts, such as children's school books, which is currently done manually, may be performed automatically and effortlessly.

Therefore, there is need for a method and system to automatically diacritize a non-diacritized text in the Arabic language.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF THE INVENTION

Before describing in detail embodiments that are in accordance with the present invention, it should be observed that the embodiments reside primarily in combinations of method steps and apparatus components related to method and system for diacritizing a text. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Explanation provided in the detailed description section, includes procedures, steps, logic blocks, processing, and other symbolic representations of operations on data bits within a computer memory. A procedure, computer-executed step, logic block, process, etc., is here, and generally, conceived to be a self-consistent sequence of steps or instructions leading to a desired result. The steps described herein require physical manipulations of physical quantities. Usually, though not necessarily, these quantities take the form of electrical or magnetic signals capable of being stored, transferred, combined, compared, and otherwise manipulated in a computer system. Further for ease of description, these signals are referred as bits, values, elements, symbols, characters, terms, numbers, or the like.

It should be noted, however, that all of these and similar terms are to be associated with the appropriate physical quantities and are merely labels applied to these quantities for ease of description. Unless specifically stated otherwise as apparent from the following explanation, it is appreciated that throughout the present invention, explanation utilizing terms such as " analyzing", "matching", " generating" "applying" "receiving" or the like, refer to the actions and processes performed by a computer system, or similar electronic computing device, that manipulates and transforms data represented as physical (electronic) quantities within the computer system's registers and memories into other data similarly represented as physical quantities within the computer system memories or registers or other such information storage, transmission or display devices.

By way of example, and not limitation, computer-usable media may comprise computer storage media and communication media. Computer storage media includes volatile and nonvolatile, removable and non-removable media implemented in any method or technology for storage of information such as computer-readable instructions, data structures, program modules or other data.

In this document, relational terms such as first and second and the like may be used solely to distinguish one entity or action from another entity or action without necessarily requiring or implying any actual such relationship or order between such entities or actions.

Various embodiments of the invention provide methods and system for diacritizing a text. The method includes analyzing the text to determine whether the text requires one or more diacritical marks, wherein the one or more diacritical marks are associated with a set of diacritical marks. In an embodiment, the set of diacritical marks may comprise fifteen diacritical marks. Further, the text is Arabic text. Thereafter, a plurality of characters associated with the text is fed to a Hidden Markov Model (HMM) in a sequential manner. The HMM then generates a sequence of diacritical marks, based on the context of the text, that most likely match the inputted text. Subsequently, the diacritical marks generated by the HMM are applied on the text for providing a diacritized Arabic text. The process of diacritizing the text is explained in detail in conjunction with FIGS. 1 and 2.

Figure 1:
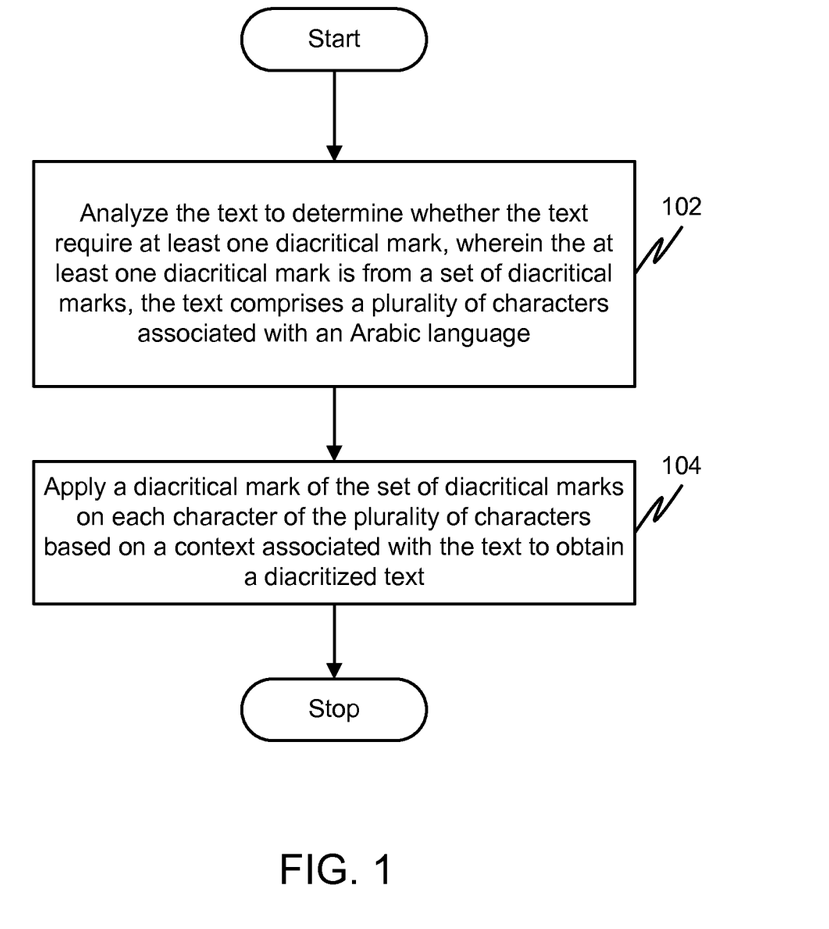
FIG. 1 illustrates a flow diagram of a method of diacritizing a text using a set of diacritical marks in accordance with an embodiment of the invention.

Referring to the figures, FIG. 1 illustrates a flow diagram of a method of diacritizing a text using a set of diacritical marks in accordance with an embodiment of the invention. A language associated with the text is Arabic language. The text includes a plurality of characters. The plurality of characters may be diacritized using diacritical marks. A diacritical mark assigned to each character of the plurality of characters may be selected from the set of diacritical marks. The set of diacritical marks may include, but not limited to, Fat-hah, Shaddah+Fat-hah, Tanween Fat-hah, Shaddah+Tanween Fat-hah, Dhammah, Shaddah+Dhammah, Tanween Dhammah, Shaddah+Tanween Dhammah, Kasrah, Shaddah+Kasrah, Tanween Kasrah, Shaddah+Tanween Kasrah, Maddah, Sukun and No diacritic.

At step 102, the text is analyzed to determine whether the text requires one or more diacritical marks. As such, the text is scanned to determine whether one or more characters of the plurality of characters associated with the text includes one or more diacritical marks. If the one or more characters include one or more diacritical marks, the one of more diacritical marks may be removed. Thereafter, the plurality of characters associated with the text may be processed in a sequential manner. In an embodiment, context associated with the text may be identified and the text may be processed using a Hidden Markov Model (HMM). As such, the context associated with the one or more characters of the plurality of characters associated with the text is identified. The context associated with the one or more characters facilitate the HMM with a probable understanding of the meaning of the text. The plurality of characters is then processed. In an embodiment, an ergodic HMM may be used to process the text. In addition, the context associated with the one or more characters is stored and used iteratively to train the ergodic HMM in order to describe the context of texts in subsequent processing's.

However, it will be apparent to the person skilled in the art that the text may be processed using any other model equivalent to the HMM such as, using concurrent neural networks.

Subsequently, at step 104, the diacritical marks of the set of diacritical marks generated are applied on each character of the plurality of characters associated with the text for providing a diacritized Arabic text. The process of generating the diacritical marks and applying the diacritical marks of the set of diacritical marks is explained in detail in conjunction with FIG. 2.

Figure 2:
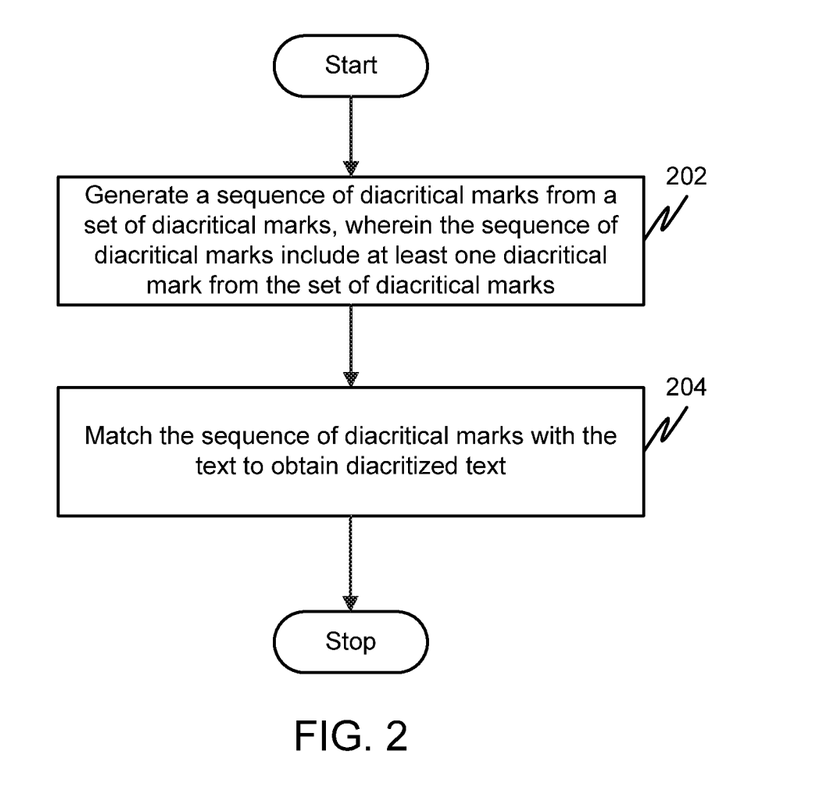
FIG. 2 illustrates a flow diagram of a method of applying a diacritical mark of a set of diacritical marks on each character of a plurality of characters in accordance with an embodiment of the invention.
Figure 3:
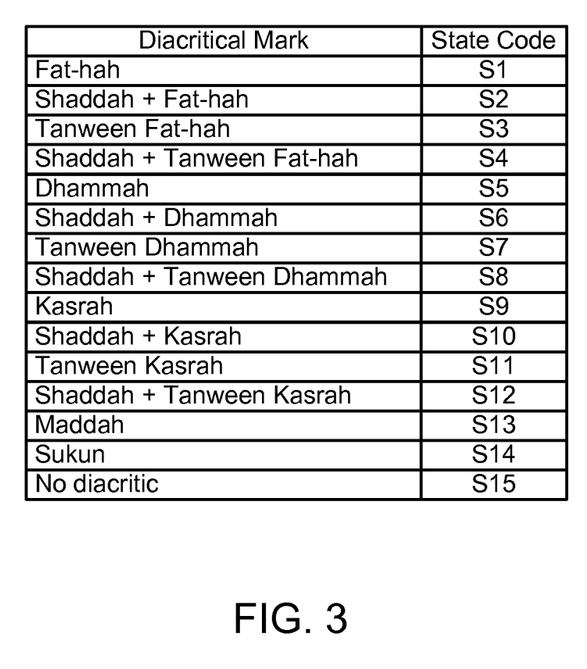
FIG. 3 illustrates a table showing a set of diacritical marks.

FIG. 2 illustrates a flow diagram of a method of applying a diacritical mark of a set of diacritical marks on each character of a plurality of characters in accordance with an embodiment of the invention. At step 202, a sequence of diacritical marks from the set of diacritical marks is generated. In an embodiment, the set of diacritical marks may comprise fifteen diacritical marks. The sequence of diacritical marks includes one or more diacritical marks from the set of diacritical marks. FIG. 3 illustrates the set of diacritical marks along with state code for each diacritical mark of the set of diacritical marks.

As such, for generating the sequence of diacritical marks from the set of diacritical marks, each character of the plurality of characters associated with the text is fed to the HMM in a sequential manner. The plurality of characters may be fed to the HMM from right to left. Alternatively, the plurality of characters may be fed to the HMM from left to right. Upon receiving each character of the plurality characters in a sequential manner, initially the HMM processes a rightmost character. The HMM applies a diacritical mark of the set of diacritical marks on the rightmost character taking into consideration the context of the text. Thereafter, the HMM checks the probability of the diacritical mark on the rightmost character and stores the probability of the diacritical mark. The probability may be considered as a measure determining the correct match of the diacritical mark on the rightmost character taking into consideration the context of the text. In an embodiment, upon receiving each character of the plurality characters in a sequential manner, an ASCII code associated with each character of the plurality of characters may be identified. Thereafter, the HMM processes the ASCII codes in a sequential manner starting with the rightmost ASCII code. This is explained further in conjunction with FIG. 4

While processing each character of the plurality of characters, the HMM transitions from one diacritical mark to another diacritical mark of the set of diacritical marks and records the probability of each diacritical mark on the rightmost character. Considering each diacritical mark of the set of diacritical marks as an individual state, the transition may be considered as a change of state from one state to another. As at any instance of time the HMM may only be in one state, the HMM undergoes a change from one state to another according to a set of probabilities associated with each state. These transitions take place in regular spaced discrete periods of time. The set of probabilities may include a transition probability related to the previous state. For example, the HMM transits from state $q_i$ at time t to a state $q_j$ at time t+1, where t=1, 2, 3, . . . M and i,j=1, 2, . . . , N, where M represents the number of observations. Therefore, transition probability $a_{ij}$ equals the expected number of transitions from state $q_i$ to state $q_j$ divided by the expected number of transitions from state $q_i$. In another words, transition probability $a_{ij}$ represents the probability that diacritical mark $q_j$ appears directly after diacritical mark $q_i$. Subsequently, the HMM finalizes a diacritical mark of the set of diacritical mark having the highest probability on the rightmost character.

Thereafter, the HMM processes the next immediate character in sequence after the rightmost character and repeats the process described above. However, while processing all the characters following the rightmost character, the HMM also takes into consideration the probability of diacritical mark applied on one or more preceding characters of the plurality of characters along with the context of the text for determining the probability of a diacritical mark on each character. Once the HMM processes each characters of the plurality of characters, the HMM provides the sequence of diacritical marks. In an embodiment, the Viterbi algorithm may be used by HMM for generating the sequence of diacritical marks. In addition, the sequence of diacritical marks includes a diacritical mark for each character of the plurality characters at exactly the same location of the particular character. For example, a diacritical mark positioned at the rightmost location of the sequence of the diacritical marks may correspond to the rightmost character of the plurality of character that was fed to the HMM for processing. In other words, the HMM provides the diacritical marks for each character of the plurality of characters in the same sequence in which each character is received by the HMM.

At step 204, the sequence of diacritical marks is matched with the text to obtain the diacritized text. For example, consider that the text which is fed to the HMM consists of ten characters such as $C_1, C_2, C_3 \ldots C_{10}$. The HMM then processes the text from right to left starting with the rightmost character $C_1$ and subsequently provides ten diacritical marks such as $D_1, D_2, D_3 \ldots D_{10}$. Therefore, the sequence of diacritical marks may be matched with the sequence of characters to obtain the diacritized text. As such, the rightmost diacritical mark $D_1$ is matched with the rightmost character $C_1$, diacritical mark $D_2$ is matched with character $C_2$ and so as to obtain the diacritized text.

Figure 4:
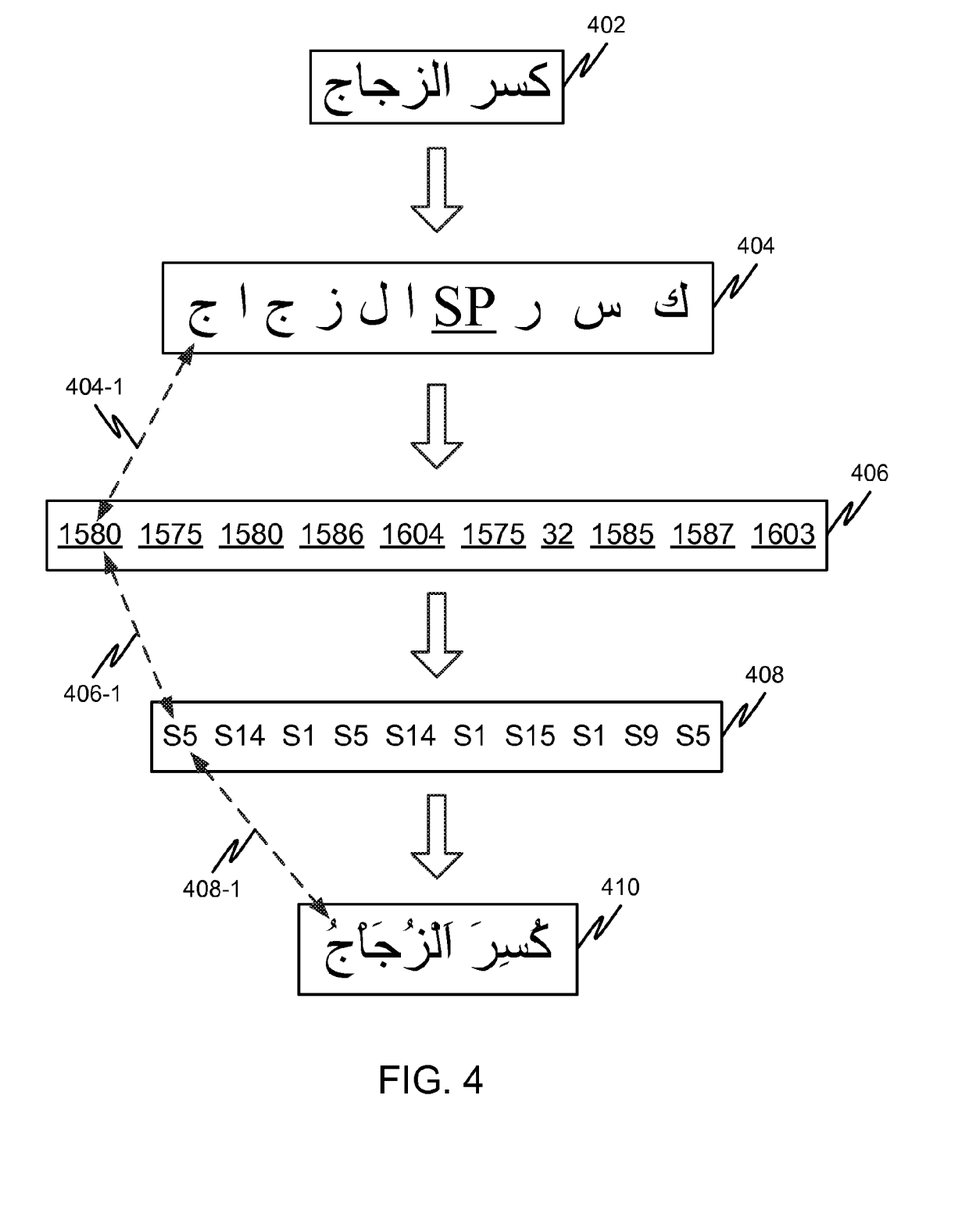
FIG. 4 illustrates a block diagram showing diacritization of an Arabic text in accordance with an exemplary embodiment of the invention.

FIG. 4 illustrates a block diagram showing diacritization of an Arabic text in accordance with an exemplary embodiment of the invention. As depicted in FIG. 4, block 402 shows an undiacritized text "كسر الزجاج" in Arabic language. The undiacritized text is then analyzed to determine whether the text requires one or more diacritical marks. Thereafter, as depicted in block 404, the undiacritized text is bifurcated to separate each character associated with the undiacritized text. Subsequently, the American Standard Code for Information Interchange (ASCII) code pertaining to each character is identified and the ASCII codes are arranged in a sequence as depicted in block 406. For example, a rightmost character in sequence "ج" has an ASCII code of 1580 depicted with an arrow 404-1.

Thereafter, ASCII codes associated with each character are fed to the HMM in sequence from right to left. Subsequently, the HMM processes each character associated with the undiacritized text to provide a diacritical mark for each character as depicted in block 408. Thus, a sequence of state codes is generated by the HMM as depicted in block 408. The sequence of state codes may correspond a sequence of diacritical marks. Further, the sequence of diacritical marks may be inferred from the table depicted in FIG. 3. The method of processing each character by the HMM for providing a diacritical mark for each character is described in detail in conjunction with FIG. 2. For example, for character "ج" whose ASCII code is 1580, the HMM provides a State Code S5 as depicted with an arrow 406-1. The State Code S5 may then be used to map the appropriate diacritical mark provided by the HMM. For example, as depicted in the table of FIG. 3, the State Code S5 pertains to a diacritical mark Dhammah.

Subsequently, the sequence of diacritical marks provided by the HMM in the form of state codes are then matched with the sequence of ASCII codes which were earlier fed to the HMM from right to left. For example, as depicted with arrow 408-1, the State Code S5 is matched with the ASCII code 1580 for providing the diacritized form of character "ج" as "جُ". Block 410 depicts the diacritized Arabic text "كُسِرَ ٱلْزُجَاجُ" which is provided after applying the sequence of diacritical marks provided by the HMM in the form of state codes with the sequence of ASCII codes which were earlier fed to the HMM from right to left. As such, each diacritical mark of the sequence of diacritical marks provided by the HMM is applied on each corresponding character of the plurality of character to obtain the diacritized text.

Figure 5:
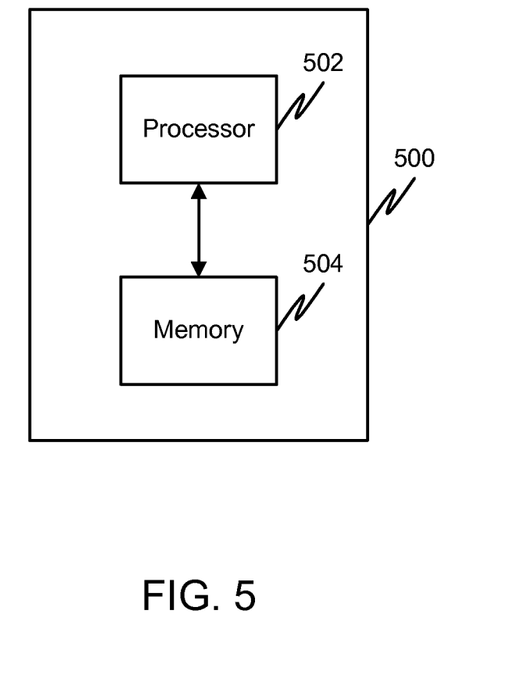
FIG. 5 illustrates a block diagram of a system for diacritizing a text using a set of diacritical marks in accordance with an embodiment of the invention.

Turning now to FIG. 5, which illustrates a block diagram of a system for diacritizing a text using a set of diacritical marks in accordance with an embodiment of the invention. As shown in FIG. 5, system 500 includes a processor 502 and a memory 504. Processor 502 interacts with memory 504 for diacritizing the text using the set of diacritical marks. In an embodiment of the invention, an undiacritized Arabic text may needs to be diacritized. For example, the undiacritized Arabic text depicted in block 402 of FIG. 4 may need to be diacritized. This undiacritized Arabic text may be received by a computing device, wherein the computing device includes a cellular phone, a laptop, a handheld device, a personal computer, a Personal Digital Assistant (PDA), a netbook among others. It will be apparent to the person skilled in the art that the any other device having a memory and processor may be used for receiving the undiacritized Arabic text. Thereafter, the undiacritized Arabic text may be stored in memory 504.

Processor 502 receives the request for diacritizing the undiacritized Arabic text. Upon receiving the request for diacritizing the undiacritized Arabic text, the processor 502 communicates with memory 504 for accessing the undiacritized Arabic text stored therein. Once processor 502 obtains the undiacritized Arabic text, processor 502 identifies each character associated with the undiacritized Arabic text. For example, the processor may identify each character associated with the undiacritized Arabic text depicted in block 404. Processor 502 then stores each character associated with the undiacritized Arabic text in a sequence in memory 504.

Thereafter, processor 502 identifies an ASCII code associated with each character. For example, processor 502 may identify the ASCII codes depicted in block 406 that are associated with each character of the undiacritized Arabic text depicted in block 404 of FIG. 4. Subsequently, the processor stores the ASCII codes associated with each character in sequence in memory 504. In the next step, processor 502 processes each character of the undiacritized Arabic text for providing a diacritical mark for each character. The method of processing each character for providing a diacritical mark for each character is described in detail in conjunction with FIG. 2. For example, processor 502 may process each character of the undiacritized Arabic text for providing a sequence of diacritical marks in the form of state codes as depicted in block 408 of FIG. 4. The process of mapping each diacritical mark with the state codes is described in detail in conjunction with FIG. 4.

Processor 502 then matches each diacritical mark of the sequence of diacritical marks with each corresponding character of the undiacritized Arabic text for providing a diacritized Arabic text. For example, processor 502 may match each diacritical mark of a sequence of diacritical marks provided in the form of a state code as depicted in block 408 with each corresponding character of block 406. Thereafter, the diacritized Arabic text is provided as depicted in block 410 of FIG. 4. Processor 502 then stores the diacritized Arabic text in memory 504.

Various embodiments of the present invention provide method and systems for diacritizing a text. The text is analyzed to determine whether the text requires one or more diacritical marks. The one or more diacritical marks are associated with a set of diacritical marks. The text may be an Arabic text. Thereafter, a plurality of characters associated with the text is fed to a Hidden Markov Model (HMM) in a sequential manner. Based on this input, the HMM then generates a sequence of diacritical marks. The sequence of diacritical marks is generated based on the context of the text that most likely match the inputted text. Subsequently, the diacritical marks generated by the HMM are applied on the text for providing a diacritized Arabic text.

Those skilled in the art will realize that the above recognized advantages and other advantages described herein are merely exemplary and are not meant to be a complete rendering of all of the advantages of the various embodiments of the present invention.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The present invention is defined solely by the appended claims including any amendments made during the pendency of this application and all equivalents of those claims as issued.

What is claimed is:

1. A computer-executable method of diacritizing a text, the method comprising:
    storing a Hidden Markov Model in computer memory for establishing a probability for associating a given diacritical mark with a given character of the text;
    inputting a sequence of individual characters of the text into a computer processor, the computer processor programmed for:
        analyzing the text to determine whether the text requires at least one diacritical mark, the text including a plurality of characters associated with an Arabic language;
        converting each character to an ASCII code;
        feeding each ASCII code in sequence to the Hidden Markov Model;
        applying an expectation-maximization process to each ASCII code starting at one end of the sequence;
        transitioning from one diacritical mark to another diacritical mark from a set of diacritical marks for each ASCII code;
        recording a probability for each diacritical mark when associated with each current ASCII code;
        changing a state of the Hidden Markov Model based on each probability over regularly spaced periods of time;
        wherein the Hidden Markov Model transitions from state $q_i$ at time t to a state $q_j$ at time t+1, where t=1, 2, 3, ... M; and i, j=1, 2, ..., N, and where M represents a number of the transitions and N represents a number of the states;
        wherein a transition probability $a_{ij}$, representing a probability that diacritical mark $q_i$ appears directly after diacritical mark $q_j$, equals an expected number of transitions from state $q_i$ to state $q_j$ divided by an expected number of transitions from state $q_i$;
        finalizing a diacritical mark having the highest probability for the current ASCII code;
        processing each character in the sequence of the text, wherein the Hidden Markov Model bases the probability at least in part on the probability of a diacritical mark applied on one or more preceding characters of the sequence and on a context of the text for determining the probability of a diacritical mark on a given character;
    generating a sequence of the diacritical marks corresponding to the sequence of characters;
    matching the sequence of diacritical marks with the text to obtain the diacritized text; and
    displaying the diacritized text on an output device.

2. The computer-executable method of claim 1, wherein the at least one diacritical mark associated with the set of diacritical marks is at least one of: Fat-hah, Shaddah+Fat-hah, Tanween Fat-hah, Shaddah+Tanween Fat-hah, Dhammah, Shaddah+Dhammah, Tanween Dhammah, Shaddah+Tanween Dhammah, Kasrah, Shaddah+Kasrah, Tanween Kasrah, Shaddah+Tanween Kasrah, Maddah, Sukun and No diacritic.

3. The computer-executable method of claim 1 further comprising determining the context associated with the text based on at least one diacritical mark applied on a portion of the text.

4. The computer-executable method of claim 1, wherein applying the diacritical mark of the set of diacritical marks on each character of the plurality of characters further comprises choosing a diacritical mark having a high probability for each character based on a context associated with at least one preceding character of the each character.

5. The computer-executable method of claim 1, wherein analyzing the text to determine whether the text requires at least one diacritical mark comprises scanning the text to determine whether each character of the plurality of characters comprises the at least one diacritical mark.

6. A system for diacritizing a text, the system comprising:
    a memory for storing a Hidden Makov Model, a text, and at least one diacritical mark of a set of diacritical marks, the text comprising a plurality of characters associated with an Arabic language;
    a processor coupled to the memory, wherein the processor is configured to:
        analyze the text to determine whether the text requires at least one diacritical mark of the set of diacritical marks;
        convert each character to an ASCII code;
        feed each ASCII code in sequence to the Hidden Markov Model;
        apply an expectation-maximization process to each ASCII code starting at one end of the sequence;
        transition from one diacritical mark to another diacritical mark from the set of diacritical marks for each ASCII code;
        record a probability for each diacritical mark when associated with each current ASCII code;
        change a state of the Hidden Markov Model based on each probability over regularly spaced periods of time;
        wherein the Hidden Markov Model transitions from state $q_i$ at time t to a state $q_j$ at time t+1, where t=1, 2, 3, ... M; and i, j=1, 2, ..., N, and where M represents a number of the transitions and N represents a number of the states;

wherein a transition probability $a_{ij}$, representing a probability that diacritical mark $q_j$ appears directly after diacritical mark $q_i$, equals an expected number of transitions from state $q_i$ to state $q_j$ divided by an expected number of transitions from state $q_i$, finalize a diacritical mark having the highest probability for the current ASCII code;

process each character in the sequence of the text, wherein the Hidden Markov Model bases the probability at least in part on the probability of a diacritical mark applied on one or more preceding characters of the sequence and on a context of the text for determining the probability of a diacritical mark on a given character;

generate a sequence of the diacritical marks corresponding to the sequence of characters;

match the sequence of diacritical marks with the text to obtain the diacritized text; and a display to present the diacritized text.

7. The system of claim 6, wherein the at least one diacritical mark associated with the set of diacritical mark is at least one of: Fat-hah, Shaddah+Fat-hah, Tanween Fat-hah, Shaddah+Tanween Fat-hah, Dhammah, Shaddah+Dhammah, Tanween Dhammah, Shaddah+Tanween Dhammah, Kasrah, Shaddah+Kasrah, Tanween Kasrah, Shaddah+Tanween Kasrah, Maddah, Sukun and No diacritic.

8. The system of claim 6, wherein the context associated with the text is determined based on at least one diacritical mark applied on a portion of the text.

9. The system of claim 6, wherein the processor is further configured to choose a diacritical mark having a high probability for each character based on a context associated with at least one preceding character of the each character.

10. The system of claim 6, wherein the processor is further configured to scan the text to determine whether each character of the plurality of characters comprises at least one diacritical mark.

11. The computer-executable method of claim 1, wherein generating the sequence of diacritical marks from the set of diacritical marks comprises using a Hidden Markov Model (HMM) for generating the sequence of diacritical marks from the set of diacritical marks, wherein the HMM uses a Viterbi algorithm for generating the sequence of diacritical marks.

12. The system of claim 6, wherein the processor is further configured to use a Hidden Markov Model (HMM) to generate the sequence of diacritical marks from the set of diacritical marks, wherein the HMM uses a Viterbi algorithm to generate the sequence of diacritical marks.

\* \* \* \* \*